US012684392B2

(12) United States Patent
Wang et al.

(10) Patent No.: US 12,684,392 B2
(45) Date of Patent: Jul. 14, 2026

(54) TECHNOLOGIES FOR AUTONOMOUS SERVING CELL MEASUREMENT

(71) Applicant: Apple Inc., Cupertino, CA (US)

(72) Inventors: Yuanye Wang, San Jose, CA (US); Amir Aminzadeh Gohari, Sunnyvale, CA (US); Anshul Kumar Gupta, Bangalore (IN); Hari Srinivas, San Diego, CA (US); Jie Cui, San Jose, CA (US); Marek Gil, San Diego, CA (US); Rangakrishna Nallandigal, Santa Clara, CA (US); Shadi Iskander, Ergolding (DE); Tamer Adel Darweesh Hassan Darweesh, Munich (DE)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 18/335,071

(22) Filed: Jun. 14, 2023

(65) Prior Publication Data

US 2024/0007891 A1 Jan. 4, 2024

Related U.S. Application Data

(60) Provisional application No. 63/355,532, filed on Jun. 24, 2022.

(51) Int. Cl.
*H04W 24/10* (2009.01)
*H04W 72/232* (2023.01)

(52) U.S. Cl.
CPC ......... *H04W 24/10* (2013.01); *H04W 72/232* (2023.01)

(58) Field of Classification Search
CPC ........................... H04W 24/10; H04W 72/232
See application file for complete search history.

(56) References Cited

U.S. PATENT DOCUMENTS

| | | | | |
|---|---|---|---|---|
| 2014/0335862 A1* | 11/2014 | Wang | .................. | H04W 36/144 |
| | | | | 455/436 |
| 2019/0363809 A1* | 11/2019 | Yoon | ..................... | H04W 56/00 |
| 2019/0394747 A1* | 12/2019 | Akkarakaran | ........ | H04L 5/0007 |
| 2020/0266867 A1* | 8/2020 | Park | ..................... | H04L 1/0681 |
| 2021/0051485 A1* | 2/2021 | Lin | ..................... | H04W 72/542 |
| 2023/0124595 A1* | 4/2023 | Jung | ..................... | H04W 48/18 |
| | | | | 370/331 |
| 2023/0239768 A1* | 7/2023 | Kowalski | ........... | H04B 7/15528 |
| | | | | 370/329 |
| 2023/0284160 A1* | 9/2023 | Takahashi | ............. | H04L 5/0053 |
| | | | | 370/503 |
| 2023/0388871 A1* | 11/2023 | Guo | .................. | H04W 36/0069 |

(Continued)

FOREIGN PATENT DOCUMENTS

| | | | | | | |
|---|---|---|---|---|---|---|
| EP | | 4117334 A1 | * | 1/2023 | ............ | H04W 24/10 |
| WO | WO-2022074602 A1 | | * | 4/2022 | ........ | H04W 36/0088 |

OTHER PUBLICATIONS

3rd Generation Partnership Project; Technical Specification Group Radio Access Network; NR; User Equipment (UE) procedures in Idle mode and RRC Inactive state (Release 17), 3GPP TS 38.304 V17.0.0, Mar. 2022, 50 pages.

*Primary Examiner* — Michael J Moore, Jr.

(74) *Attorney, Agent, or Firm* — Kilpatrick Townsend & Stockton LLP

(57) ABSTRACT

The present application relates to devices and components including apparatus, systems, and methods for autonomous serving cell measurement and evaluation.

20 Claims, 7 Drawing Sheets

(56)         References Cited

U.S. PATENT DOCUMENTS

2024/0007891 A1*   1/2024   Wang ................... H04W 24/10
2025/0133575 A1*   4/2025   Maaref ................ H04L 5/0044
2025/0203602 A1*   6/2025   Li ....................... H04B 7/0456

* cited by examiner

600

Receiving MSI from serving cell
604

Determining a measurement information
based on the MSI
608

Performing an autonomous measurement of
the serving cell based on the measurement
information
612

TECHNOLOGIES FOR AUTONOMOUS SERVING CELL MEASUREMENT

CROSS-REFERENCE TO RELATED APPLICATION

This application claims the benefit of U.S. Provisional Patent Application No. 63/355,532, filed on Jun. 24, 2022, which is hereby incorporated by reference in its entirety for all purposes.

FIELD

This application relates to the field of wireless networks and, in particular, to autonomous serving cell measurements in said networks.

BACKGROUND

User equipments (UEs) operating in a cellular network may periodically associate with different serving cells. Aspects related to the selection and association of the UEs with the different serving cells may be considered.

DETAILED DESCRIPTION

Figure 1:
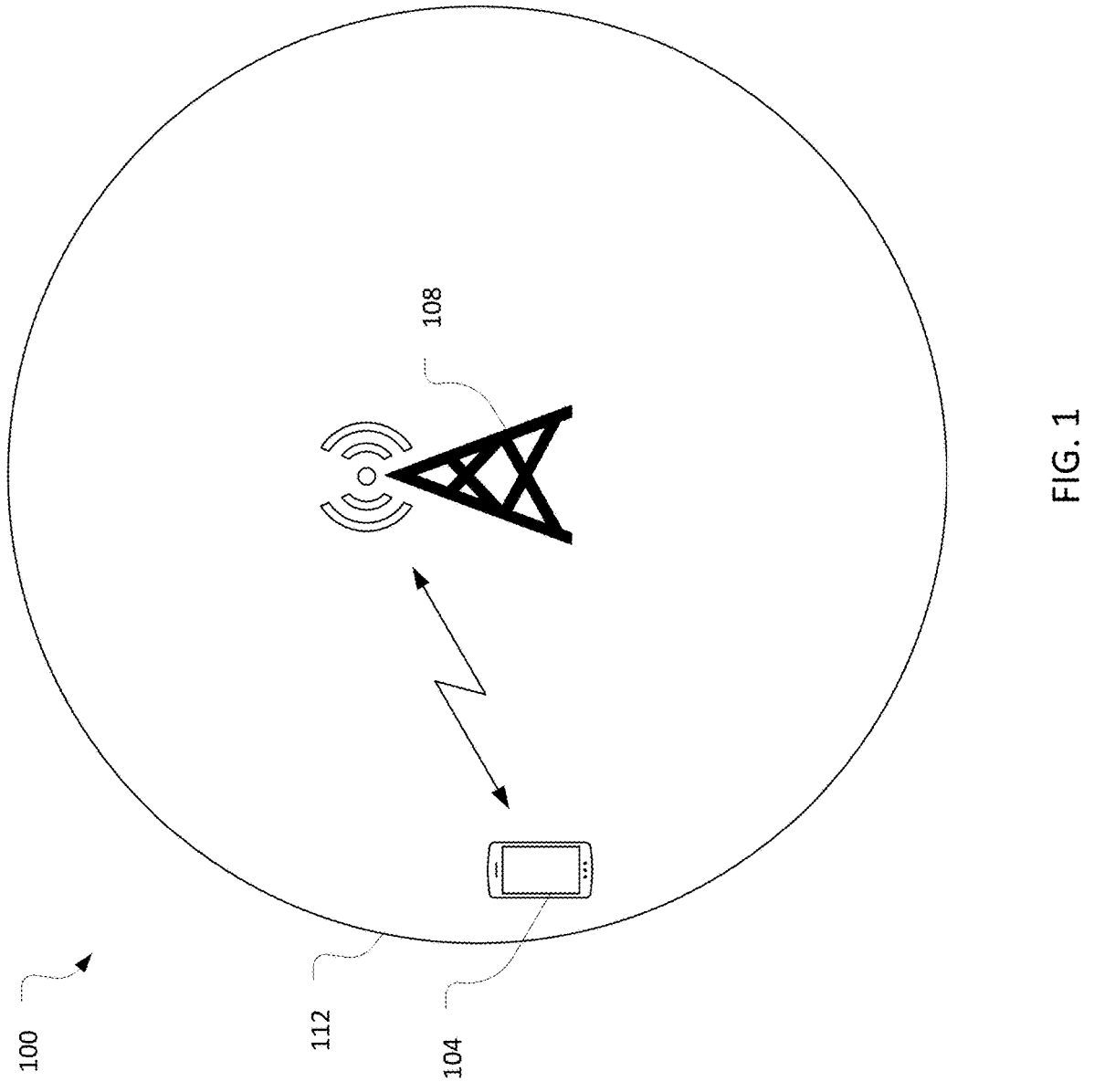
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a user equipment 104 and a base station 108. In some embodiments, the base station 108 may provide one or more wireless access cells, for example, serving cell 112, through which the UE 104 may communicate with a cellular network.

The UE 104 and the base station 108 may communicate over air interfaces compatible with Fifth Generation (5G) NR (or later) system standards as provided by Third Generation Partnership Project (3GPP) technical specifications.

The UE 104 may include a radio resource control (RRC) state machine that performs operations related to a variety of RRC procedures including, for example, paging, RRC connection establishment, RRC connection reconfiguration, and RRC connection release. The RRC state machine may be implemented by protocol processing circuitry, see, for example, processors 704 of FIG. 7.

The RRC state machine may transition the UE 104 into one of a number of RRC states (or "modes") including, for example, a connected state (RRC connected), an inactive state (RRC inactive), and an idle state (RRC idle). The UE 104 may start in RRC idle when it first camps on a serving cell, which may be after the UE 104 is switched on or after a cell reselection from another cell. To engage in active communications, the RRC state machine may transition the UE 104 from RRC idle to RRC connected by performing an RRC setup procedure to establish a logical connection, for example, an RRC connection, with a base station. In RRC connected, the UE 104 may be configured with at least one signaling radio bearer (SRB) for signaling (for example, control messages) with the base station; and one or more data radio bearers (DRBs) for data transmission. When the UE 104 is less actively engaged in network communications, the RRC state machine may transition the UE 104 from RRC connected to RRC inactive using an RRC release procedure. The RRC inactive state may allow the UE 104 to reduce power consumption as compared to RRC connected, but will still allow the UE 104 to quickly transition back to RRC connected to transfer application data or signaling messages.

On occasion, the UE 104 may select a new serving cell on which to camp. This may occur if, for example, the UE 104 selects a new public land mobile network or a standalone non-public network (SNPN) while in an RRC idle or inactive state. If the UE 104 has cell information stored for the PLMN/SNPN it may attempt to find a suitable cell based on the stored information. In this instance, the UE 104 may leverage the stored information to identify candidate carrier frequencies. If the UE 104 does not have cell information stored for the PLMN/SNPN, all radio-frequency (RF) channels in its supported frequency bands may be considered candidate frequencies.

To find a suitable cell on which to camp, the UE 104 may search for synchronization signal/physical broadcast channel blocks (SSBs) at the candidate carrier frequencies. The UE 104 may measure the SSBs to identify the strongest cell or cells and decode associated or referenced system information to determine whether cell selection criteria are met.

The system information may be transmitted by a master information block (MIB) in the PBCH of the identified SSB, and system information block 1 (SIB1). The MIB and the SIB1 include minimum system information (MSI), while other SIBs, for example, SIBs 2-9, include other system information (OSI). The MIB may provide the UE 104 with an indication of whether the cell is barred and may also include information to decode the SIB1 in a physical downlink shared channel (PDSCH) transmission.

In existing NR networks, idle/inactive mode serving and intra-frequency measurements are only started after receiving system information block 2 (SIB2). However, it may take a considerably amount of time before a camped UE is able to decode SIB2. Thus, in existing networks, a UE may not be able to track serving cell quality before successfully decoding SIB2. If the serving cell quality degrades after a UE camps on a serving cell, and the UE is unable to decode SIB2, the UE may be stuck on the serving cell for a significant period of time.

Embodiments of the present disclosure provide for the UE 104 to autonomously perform serving cell measurements based on SIB1 and other known system information. As used herein, an "autonomous serving cell measurement" may refer to a serving cell measurement that is done upon the initiative of the UE 104 without, for example, the base station 108 providing the UE 104 with a configuration, e.g., using a SIB2 transmission, to perform a specific measurement of the serving cell 112. This may allow the UE 104 to track a quality of the serving cell 112 before receiving SIB2 from the base station 108. In some embodiments, the UE 104 may trigger a serving cell release based on comparing the quality to one or more pre-defined thresholds.

The UE 104 may acquire measurement information to support the autonomous serving cell measurement. The measurement information may include SSB frequency and subcarrier spacing; an SSB bitmap; SSB periodicity; and received signal strength indicator (RSSI)/reference signal received quality (RSRQ) measurement configuration information.

The SSB frequency and subcarrier spacing used to perform the autonomous serving cell measurement may be the same configuration as the PBCH decoded as part of the initial cell selection.

The SSB bitmap may be conveyed by an SSB-positions-in-burst (ssb-PositionsInBurst) field of a serving cell configuration common (ServingCellConfigCommon) IE within the SIB1. The ServingCellConfigCommon IE may be used to configure cell-specific parameters of the serving cell 112. The SSB bitmap, which may be a short bitmap of four bits, a medium bitmap of eight bits, or a long bitmap of sixty-four bits, may indicate which SSBs within an SSB burst are actually transmitted. For example, the first/leftmost bit may correspond to a first SSB index (e.g., SSB0), the second bit may correspond to a second SSB index (e.g., SSB1), etc. The value may be '0' to indicate the associated SSB is not transmitted, and may be '1' to indicate the associated SSB is transmitted.

In existing networks, if a UE receives an SSB bitmap in SIB2, a UE may measure the SSBs on the SSB symbols and one data symbol before and after the SSB symbols. Consequently, the UE may also determine that both the SSB symbols and adjacent symbols are not available for scheduling data. The extra symbols before/after the SSB symbols are needed to accommodate propagation delay from neighboring cells.

Embodiments of the present disclosure, on the other hand, are focused on serving cell measurements. Thus, the symbols before/after the SSB symbols (as configured by the SIB1), may not be used by the UE 104 for serving cell measurements, as their use would bring no benefit. Further, the UE 104 may consider these symbols usable for the data path to avoid impacting normal downlink/uplink traffic. For example, the symbols before/after the SSB symbols may be used for uplink or downlink random access channel (RACH) transmissions.

The SSB frequency may be conveyed by an SSB-periodicity-serving cell (ssb-PeriodicityServingCell) field of the ServingCellConfigCommon IE within the SIB1. The SSB periodicity may be given in milliseconds (ms) for rate matching purposes. In some embodiments, the frequency may be 5 ms, 10 ms, 20 ms, 40 ms, 80 ms, or 160 ms. If this field is absent, the UE 104 may assume the frequency is a default value, for example, 5 ms.

In operation of existing networks, a UE may determine an RSSI measurement configuration from a SIB2 transmission. Without the benefit of this configuration information from SIB2, and in order to avoid any unnecessary scheduling restrictions or inaccurate measurement on downlink symbols without data traffic, the UE 104 may assume a default configuration and restrict RSRQ/RSSI measurement to the SSB symbols. In some embodiments, the UE 104 may use symbols in addition to the SSB symbols for RSRQ/RSSI measurements in the event it is determined that the use of the additional symbols does not create unnecessary scheduling restrictions to the data path. Determining whether use of additional symbols to measure RSRQ/RSSI would create unnecessary scheduling restrictions may be based on frequency band or duplexing scheme in which the UE 104 is operating, capabilities of the UE 104, etc.

The SSB measurement timing configuration (SMTC) offset and duration may be provided in SIB2. However, this information may be relevant for neighbor cell measurements. For serving cell measurements, as discussed herein, the UE 104 may only perform the measurements based on the SSB symbols and, therefore, the SMTC offset and duration may not be applicable.

Figure 2:
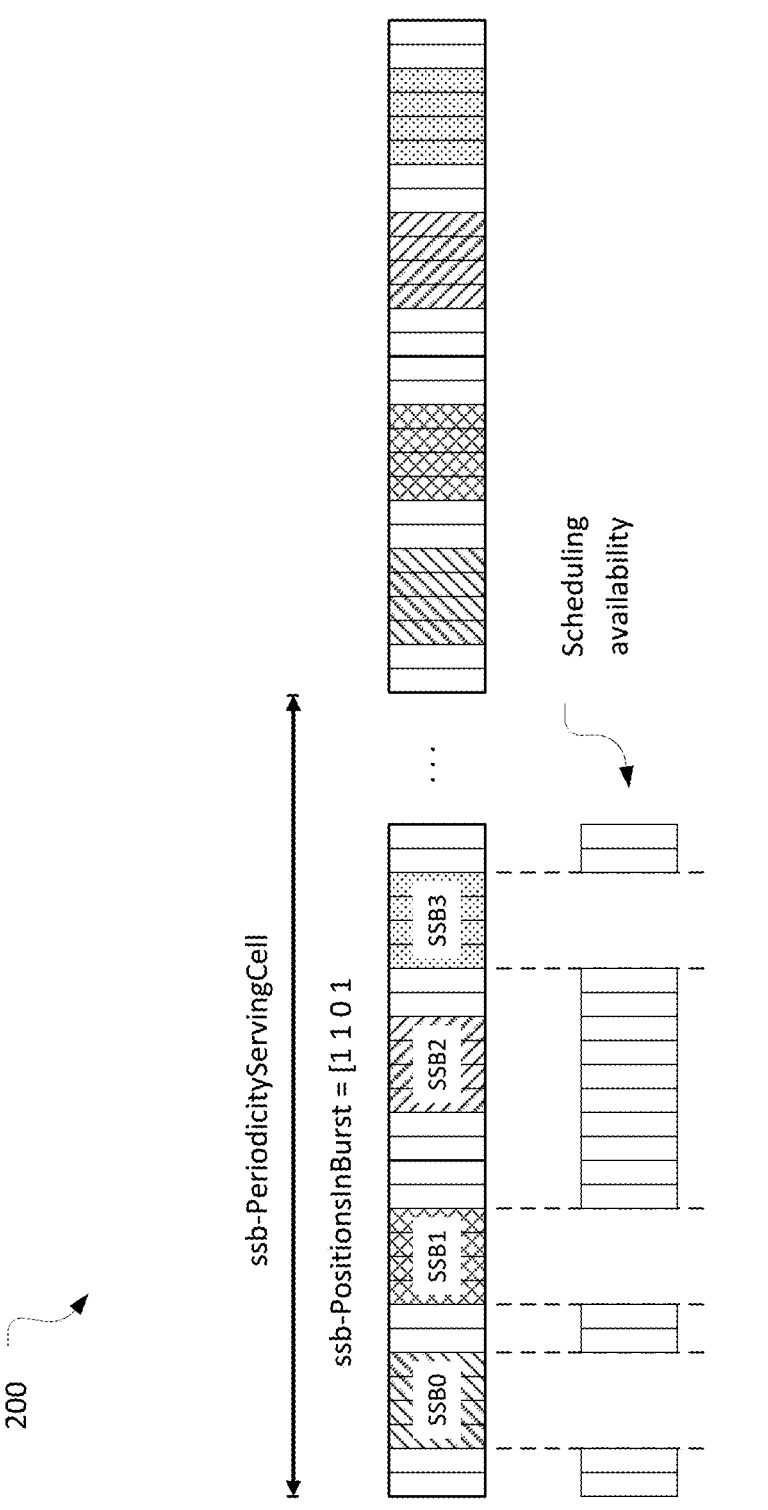
FIG. 2 illustrates a synchronization signal and physical broadcast channel block burst pattern in accordance with some embodiments.

FIG. 2 illustrates an SSB burst pattern 200 in accordance with some embodiments. The SSB burst pattern 200 may include a set of four possible SSBs within an SSB period defined by ssb-PeriodicityServingCell. The SSB burst pattern 200 may repeat in the following SSB period.

In this embodiment, a SIB1 transmission may include an ssb-PositionsInBurst field with a four-bit SSB bitmap of [1 1 0 1]. Each of the bit values of the SSB bitmap may be associated with a respective SSB index of the SSB burst pattern 200. For example, the first bit value may be associated with SSB0, the second bit value may be associated with SSB1, the third bit value may be associated with SSB2, and the fourth bit value may be associated with SSB3. Thus, the SSB bitmap of [1 1 0 1] may indicate that the base station 108 is to transmit SSBs at SSB0, SSB1, and SSB3. The UE 104 may then perform all serving cell measurements including, for example, reference signal receive power (RSRP), RSSI, RSRQ, or signal-to-interference-plus noise ratio (SINR) measurements, on the symbols used to transmit SSB0, SSB1, and SSB3 as indicated by the SSB bitmap signaled by the SIB1 transmission.

The UE 104 may determine that a scheduling availability constraint, applicable to the data path, only applies to symbols colliding with the symbols upon which the SSBs are transmitted. There may be no scheduling constraint for symbols that do not collide with the symbols upon which the SSBs are transmitted (including the symbols adjacent to the SSB symbols). Thus, any symbol other than those corresponding to the symbols used to transmit SSB0, SSB1, and SSB3 may be used for data path transmissions.

In addition to radio resource management (RRM) measurement configurations, SIB2 also provide various information related to cell quality evaluation and reselection. In some embodiments, before receiving the SIB2, the UE 104 may perform an autonomous serving cell evaluation and release based on the autonomous serving cell measurements.

To perform the autonomous serving cell evaluation, the UE 104 may store and apply default settings of one or more serving cell quality thresholds. These self-configured thresholds may be from a previous SIB2 message, a predefined setting stored at the UE 104, or from a preconfigured database accessible by the UE 104. The UE 104 may evaluate the suitability of the serving cell 112 based on the results of the autonomous serving cell measurements compared to the self-configured thresholds. In some embodiments, the UE 104 may autonomously release the current serving cell based on self-defined criteria. For example, the criteria may indicate that the serving cell 112 is not suitable if the autonomous serving cell measurements are less than the self-configured thresholds for a predetermined time duration. After the UE 104 autonomously releases the serving cell 112, it may trigger another initial cell selection procedure.

Figure 3:
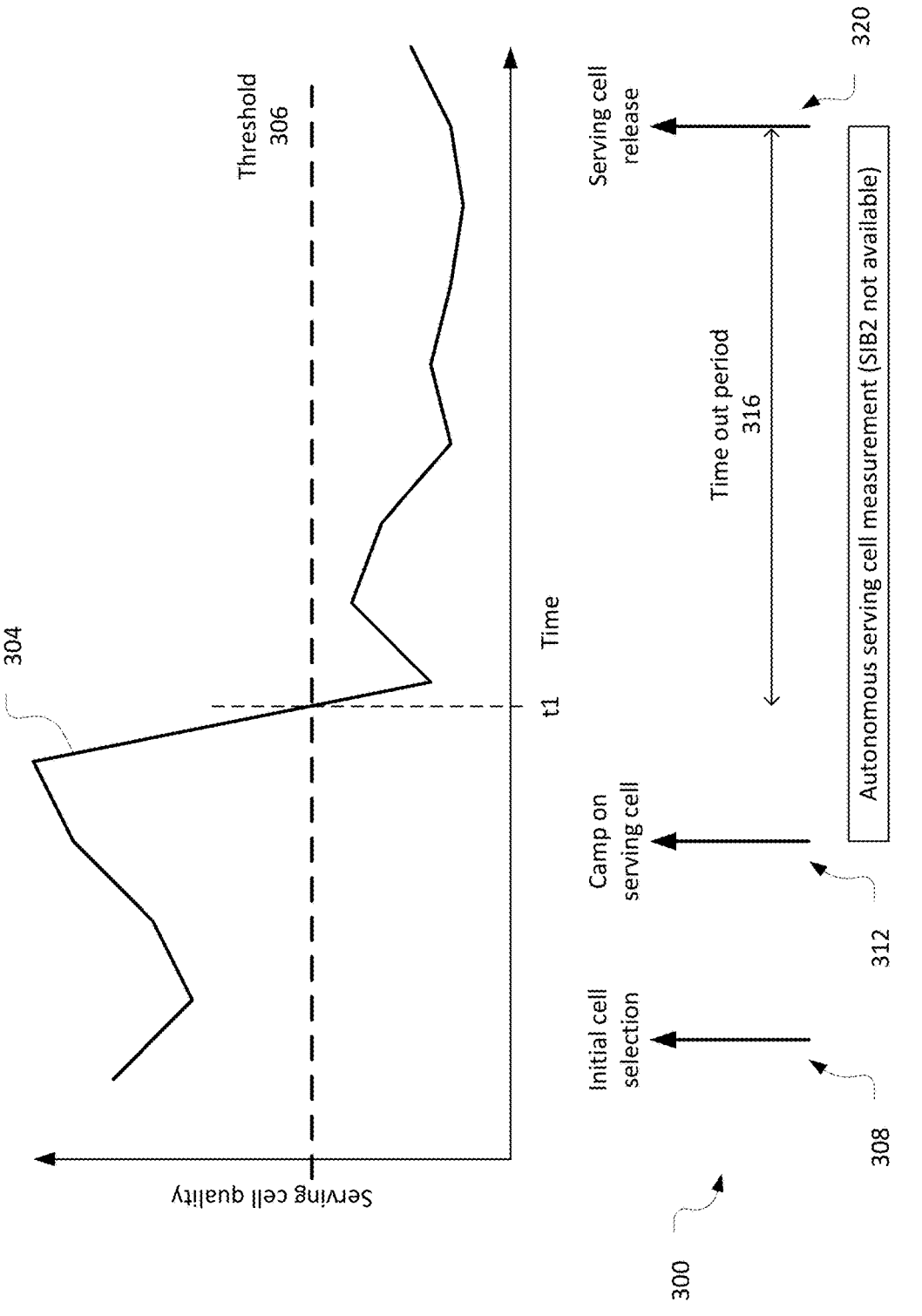
FIG. 3 illustrates an autonomous serving cell evaluation and release operation along with a serving cell quality charted over a period of time in accordance with some embodiments.

FIG. 3 illustrates an autonomous serving cell evaluation and release operation 300 along with a serving cell quality 304 charted over a period of time as compared to a predetermined threshold 306 in accordance with some embodiments. The serving cell quality 304 may be in terms of RSRP or another suitable cell quality metric such as, for example, RSRQ, RSSI, or SINR.

At 308, the UE 104 may perform an initial cell selection and, at 312, camp on the serving cell 112. After camping on the serving cell 112, but before the SIB2 is available, the UE 104 may perform autonomous serving cell measurements. Upon performing the first autonomous serving cell measurement after t1, the UE 104 may determine the serving cell quality 304 drops below the predetermined threshold 306. In this embodiment, the UE 104 may have a release criteria that defines a time out period 316. If the autonomous serving cell measurements indicate that the serving cell quality 304 is below the threshold 306 for the entire time-out period 316, the UE 104 may perform a serving cell release at 320 and proceed to perform another initial cell selection. In some embodiments, the time-out period may reset if the serving cell quality 304 exceeds the threshold. In some instances, the time-out period may reset only if the serving cell quality 304 exceeds the threshold for a predetermined period of time.

Figure 4:
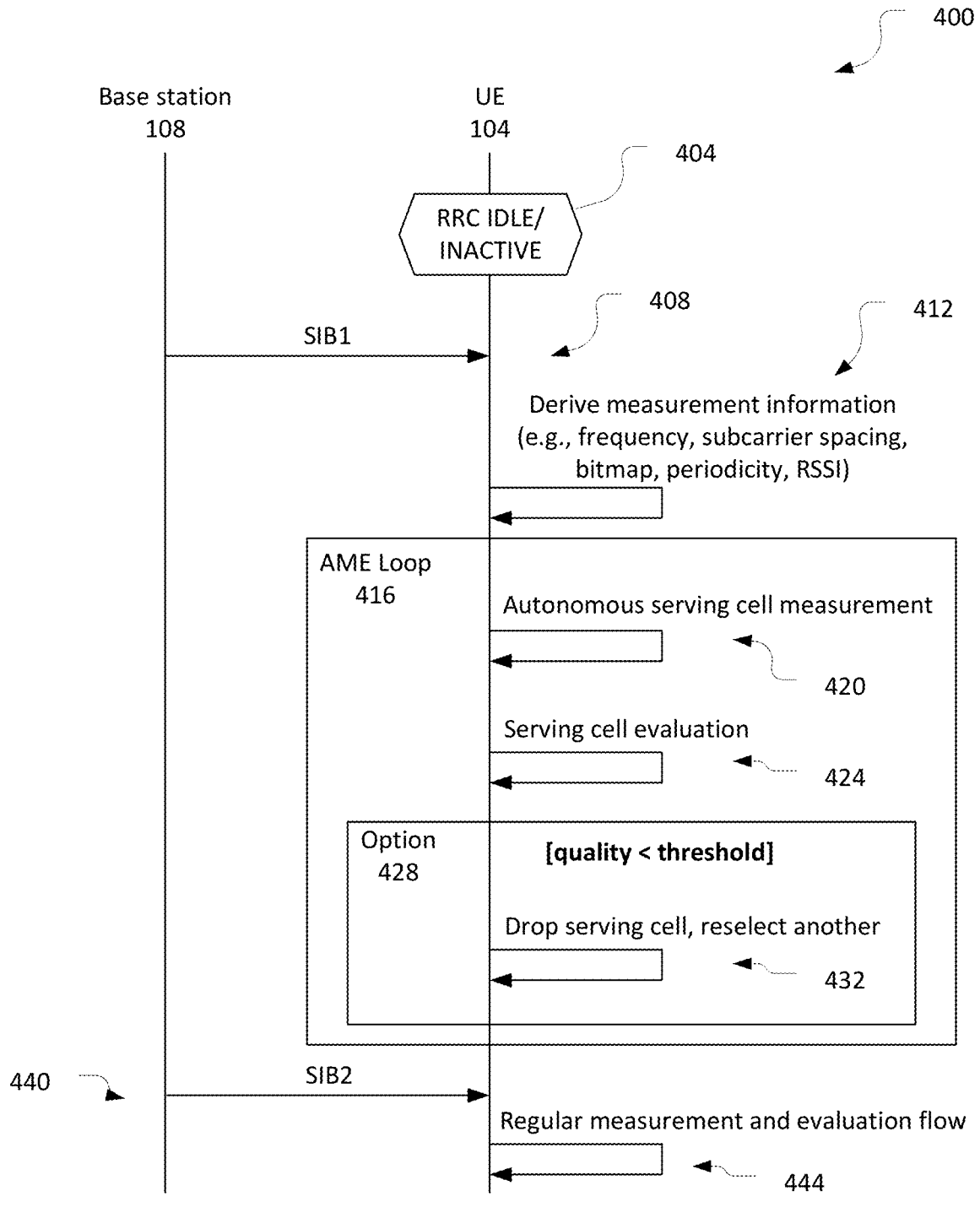
FIG. 4 illustrates a signaling and operational flow in accordance with some embodiments.

FIG. 4 illustrates a signaling and operational flow 400 in accordance with some embodiments. The flow 400 may start with the UE 104 camped on the serving cell 112. While camped, the UE 104 may be in an RRC idle or inactive mode at 404.

At 408, the base station 108 may transmit, and the UE 104 may receive, a SIB1 transmission.

At 412, the UE 104 may derive measurement information. The measurement information may include, for example, SSB frequency and subcarrier spacing, an SSB bitmap, an SSB periodicity, and an RSSI/RSRQ measurement configuration. The UE 104 may derive this measurement information based on the SIB1 transmission and other system information including, for example, information obtained during the initial selection of the serving cell 112.

Upon deriving the measurement information for autonomous measurements, the UE 104 may enter an autonomous measurement and evaluation (AME) loop 416.

The AME loop 416 may include, at 420, performing an autonomous serving cell measurement based on the measurement configuration. The autonomous serving cell measurement may provide an indication of a serving cell quality.

The AME loop 416 may further include, at 424, performing a serving cell evaluation. The serving cell evaluation may be performed by comparing the serving cell quality to a predetermined threshold.

In option 428, if the serving cell quality is less than the threshold, the AME loop 416 may include, at 432, dropping the serving cell 112 and reselecting another serving cell.

In the event the UE 104 does not drop the serving cell 112 at 432, it may ultimately receive a SIB2 at 440. The UE 104 may receive the SIB2 based on scheduling information conveyed in the SIB1. The SIB2 may include information to define measurements for intra-frequency, inter-frequency, and inter-system cell reselection.

At 444, the UE 104 may perform regular measurement and evaluation flow for cell reselection based on the measurements configured by the SIB2.

Figure 5:
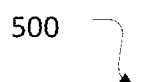
FIG. 5 illustrates an operational flow/algorithmic structure in accordance with some embodiments.
Figure 5:
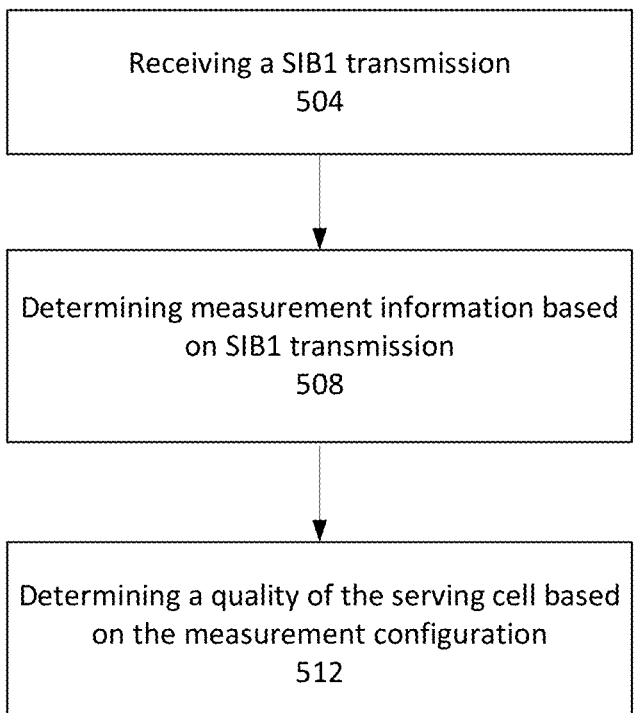

FIG. 5 includes an operation flow/algorithmic structure 500 in accordance with some embodiments. The operation flow/algorithmic structure 500 may be performed or implemented by a device such as, for example, UE 104 or UE 700; or components thereof, for example, processors 704.

The operation flow/algorithmic structure 500 may include, at 504, receiving a SIB1 transmission. The SIB1 transmission may be received by the UE while in an RRC idle or inactive mode. Prior to receiving the SIB1 transmission, the UE may discover an SSB through an initial cell selection. The PBCH of the SSB may carry an MIB with information regarding the control resource set and search space used by a physical downlink control channel (PDCCH) that schedules a PDSCH having the SIB1 transmission.

The operation flow/algorithmic structure 500 may further include, at 508, determining measurement information based on the SIB1 transmission. The measurement information may include an SSB bitmap and periodicity provided by respective SIB1 fields.

The measurement information may be further based on system information in addition to the system information carried by the SIB1 transmission. For example, the measurement configuration may be further based on the PBCH used in the initial cell selection. The UE may determine the SSB frequency and subcarrier spacing based on decoding this PBCH.

The measurement information may further include an RSRQ/RSSI measurement configuration. In some embodiments, this may be a default configuration to perform RSRQ/RSSI measurement only on SSB symbols.

The operation flow/algorithmic structure 500 may further include, at 512, determining a quality of the serving cell based on the measurement information. The quality of the serving cell may be determined by measuring SSB symbols identified through the measurement information. The quality of the serving cell may be determined by performing measurements to determine, for example, RSSI, RSRQ, RSRP, or SINR.

In some embodiments, the quality of the serving cell may be compared to various criteria to determine whether to release the serving cell and perform another initial cell search. For example, if the quality is below a predetermined threshold for a predetermined period of time, the UE may release the serving cell.

The determination of the quality of the serving cell at 512 may be done without receiving a current SIB2 transmission from the serving cell. A "current SIB2 transmission," as used herein, may refer to a SIB2 transmission received from the serving cell subsequent to receipt of the SIB1 transmission from the serving cell.

Figure 6:
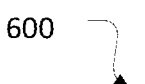
FIG. 6 illustrates another operational flow/algorithmic structure in accordance with some embodiments.
Figure 6:
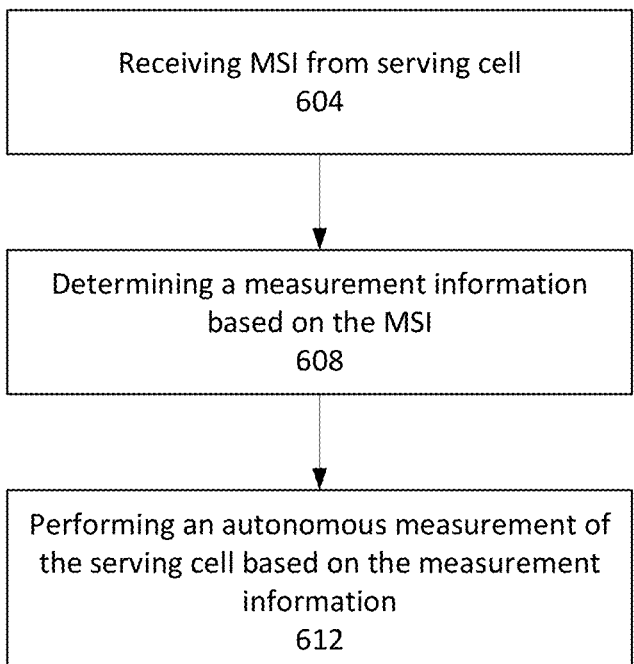

FIG. 6 may include an operation flow/algorithmic structure 600 in accordance with some embodiments. The operation flow/algorithmic structure 600 may be performed or implemented by a UE such as, for example, UE 104 or UE 700; or components thereof, for example, processors 704.

The operation flow/algorithmic structure 600 may include, at 604, receiving MSI from a serving cell. The MSI may be conveyed by an MIB within a PBCH used for an initial cell selection and a SIB1 within a PDSCH.

The operation flow/algorithmic structure 600 may further include, at 608, determining measurement information based on the MSI. Similar to that discussed above, the measurement information may include an SSB bitmap and periodicity provided by respective SIB1 fields, SSB frequency and subcarrier spacing based on decoding the PBCH that carries the MIB, and a default RSRQ/RSSI measurement configuration.

The operation flow/algorithmic structure 600 may further include, at 612, performing an autonomous measurement of the serving cell based on the measurement information. The autonomous measurement may be performed on the initiative of the UE without a base station specifically configuring the UE to perform the measurements. The autonomous measurements may be RSSI/RSRQ/RSRP/SINR measurements that are based on SSBs transmitted by the serving cell.

In some embodiments, the UE may perform a serving cell evaluation based on the autonomous measurement and determine whether to drop the serving cell and perform another initial cell selection based on the serving cell evaluation. The serving cell evaluation may be performed by comparing the autonomous measurement to a predetermined threshold. This may be done over time to determine whether a certain number of consecutive measurements remain below the threshold, or consecutive measurements remain below the threshold for a predetermined period of time.

Figure 7:
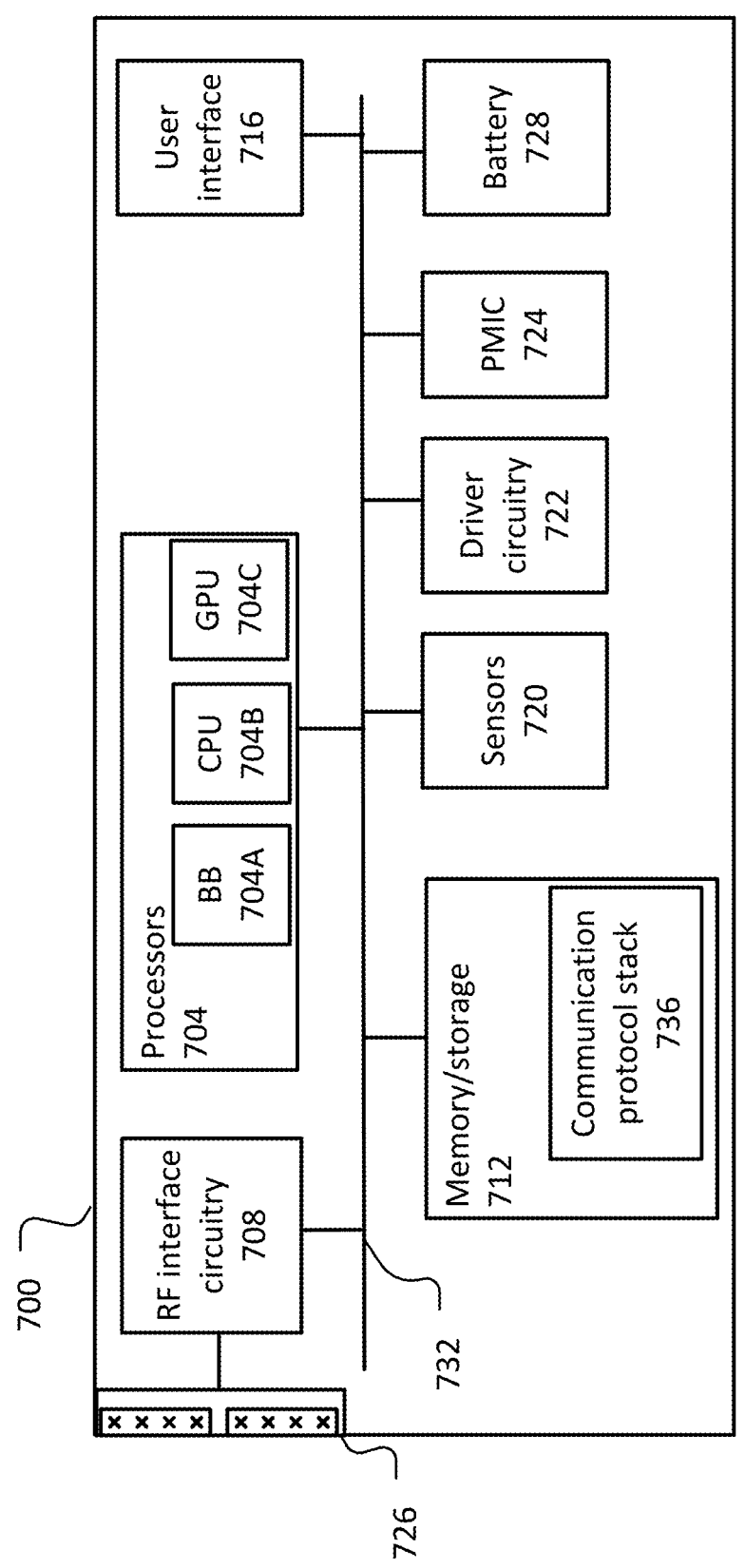
FIG. 7 illustrates a user equipment in accordance with some embodiments.

FIG. 7 illustrates an example UE 700 in accordance with some embodiments. The UE 700 may be any mobile or non-mobile computing device, such as, for example, a mobile phone, a computer, a tablet, an industrial wireless sensor (for example, a microphone, a carbon dioxide sensor, a pressure sensor, a humidity sensor, a thermometer, a motion sensor, an accelerometer, a laser scanner, a fluid level sensor, an inventory sensor, an electric voltage/current meter, or an actuators), a video surveillance/monitoring device (for example, a camera), a wearable device (for example, a smart watch), or an Internet-of-things (IoT) device.

The UE 700 may include processors 704, RF interface circuitry 708, memory/storage 712, user interface 716, sensors 720, driver circuitry 722, power management integrated circuit (PMIC) 724, antenna structure 726, and battery 728. The components of the UE 700 may be implemented as integrated circuits (ICs), portions thereof, discrete electronic devices, or other modules, logic, hardware, software, firmware, or a combination thereof. The block diagram of FIG. 7 is intended to show a high-level view of some of the components of the UE 700. However, some of the components shown may be omitted, additional components may be present, and different arrangement of the components shown may occur in other implementations.

The components of the UE 700 may be coupled with various other components over one or more interconnects 732, which may represent any type of interface, input/output, bus (local, system, or expansion), transmission line, trace, optical connection, etc. that allows various circuit components (on common or different chips or chipsets) to interact with one another.

The processors 704 may include processor circuitry such as, for example, baseband processor circuitry (BB) 704A, central processor unit circuitry (CPU) 704B, and graphics processor unit circuitry (GPU) 704C. The processors 704 may include any type of circuitry or processor circuitry that executes or otherwise operates computer-executable instructions, such as program code, software modules, or functional processes from memory/storage 712 to cause the UE 700 to perform operations as described herein.

In some embodiments, the baseband processor circuitry 704A may access a communication protocol stack 736 in the memory/storage 712 to communicate over a 3GPP compatible network. In general, the baseband processor circuitry 704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 708.

The baseband processor circuitry 704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 712 may include one or more non-transitory, computer-readable media that includes instructions (for example, communication protocol stack 736) that may be executed by one or more of the processors 704 to cause the UE 700 to perform various operations described herein. The memory/storage 712 include any type of volatile or non-volatile memory that may be distributed throughout the UE 700. In some embodiments, some of the memory/storage 712 may be located on the processors 704 themselves (for example, L1 and L2 cache), while other memory/storage 712 is external to the processors 704 but accessible thereto via a memory interface. The memory/storage 712 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 708 may include transceiver circuitry and radio frequency front module (RFEM) that allows the UE 700 to communicate with other devices over a radio access network. The RF interface circuitry 708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 726 and proceed to filter and amplify (with a low-noise amplifier) the signal. The signal may be provided to a receiver of the transceiver that down-converts the RF signal into a baseband signal that is provided to the baseband processor of the processors 704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 726.

In various embodiments, the RF interface circuitry 708 may be configured to transmit/receive signals in a manner compatible with NR access technologies.

The antenna structure 726 may include antenna elements to convert electrical signals into radio waves to travel through the air and to convert received radio waves into electrical signals. The antenna elements may be arranged into one or more antenna panels. The antenna structure 726 may have antenna panels that are omnidirectional, directional, or a combination thereof to enable beamforming and multiple-input, multiple-output communications. The antenna structure 726 may include microstrip antennas, printed antennas fabricated on the surface of one or more printed circuit boards, patch antennas, phased array antennas, etc. The antenna structure 726 may have one or more panels designed for specific frequency bands including bands in FR1 or FR2.

In some embodiments, the UE 700 may include beamforming circuitry utilized for communication with the UE 700.

The user interface 716 includes various input/output (I/O) devices designed to enable user interaction with the UE 700. The user interface 716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 700.

The sensors 720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 722 may include software and hardware elements that operate to control particular devices that are embedded in the UE 700, attached to the UE 700, or otherwise communicatively coupled with the UE 700. The driver circuitry 722 may include individual drivers allowing other components to interact with or control various input/output (I/O) devices that may be present within, or connected to, the UE 700. For example, driver circuitry 722 may include a display driver to control and allow access to a display device, a touchscreen driver to control and allow access to a touchscreen interface, sensor drivers to obtain sensor readings of sensors 720 and control and allow access to sensors 720, drivers to obtain actuator positions of electro-mechanic components or control and allow access to the electro-mechanic components, a camera driver to control and allow access to an embedded image capture device, audio drivers to control and allow access to one or more audio devices.

The PMIC 724 may manage power provided to various components of the UE 700. In particular, with respect to the processors 704, the PMIC 724 may control power-source selection, voltage scaling, battery charging, or DC-to-DC conversion.

In some embodiments, the PMIC 724 may control, or otherwise be part of, various power saving mechanisms of the UE 700. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 700 may power down for brief intervals of time and thus save power. If there is no data traffic activity for an extended period of time, then the UE 700 may transition off to an RRC Idle state, where it disconnects from the network and does not perform operations such as channel quality feedback, handover, etc. The UE 700 goes into a very low power state and it performs paging where again it periodically wakes up to listen to the network and then powers down again. The UE 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 728 may power the UE 700, although in some examples the UE 700 may be mounted deployed in a fixed location, and may have a power supply coupled to an electrical grid. The battery 728 may be a lithium ion battery, a metal-air battery, such as a zinc-air battery, an aluminum-air battery, a lithium-air battery, and the like. In some implementations, such as in vehicle-based applications, the battery 728 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a device, the method comprising: receiving, while in a radio resource control (RRC) idle or inactive state, a system information block 1 (SIB1) transmission from a serving cell; determining measurement information based on the SIB1 transmission; and determining a quality of the serving cell based on the measurement information.

Example 2 includes the method of example 1 or some other example herein, wherein determining a quality of the serving cell comprises: measuring a synchronization signal and physical broadcast channel block (SSB).

Example 3 includes the method of example 2 or some other example herein, further comprising: determining, as part of the measurement information, that one or more SSBs are transmitted within an SSB burst based on an SSB bitmap within an SSB-positions-in-burst field of the SIB1 transmission.

Example 4 includes the method of example 2 or some other example herein, wherein: determining, as part of the measurement information, an SSB periodicity based on an indication within an SSB-periodicity field of the SIB1 transmission.

Example 5 includes the method of example 2 or some other example herein, further comprising: receiving a physical broadcast channel (PBCH); performing an initial attach with the serving cell based on the PBCH; and determining the measurement information based further on the PBCH.

Example 6 includes the method of example 5 or some other example herein, further comprising: determining, as part of the measurement information, synchronization signal and physical broadcast channel block (SSB) frequency and subcarrier spacing based on the PBCH.

Example 7 includes the method of example 2 or some other example herein, further comprising: determining the SSB is to be transmitted on a plurality of symbols; and measuring the SSB by restricting measurements to the plurality of symbols.

Example 8 includes the method of example 1 or some other example herein, further comprising: comparing the quality of the serving cell to a predetermined threshold; releasing the serving cell based on said comparing; and initiating a cell-selection procedure based on said releasing the serving cell.

Example 9 includes the method of example 8 or some other example herein, further comprising: releasing the serving cell based further on a determination that the quality of the serving cell is less than the predetermined threshold for a predetermined period of time.

Example 10 includes the method of example 1 or some other example herein, further comprising: determining the quality of the serving cell without receiving a system information block 2 (SIB2) transmission from the serving cell subsequent to receiving the SIB1 transmission.

Example 11 includes a method of operating a user equipment, the method comprising: receiving minimum system information (MSI) from a serving cell; determining measurement information based on the MSI; and performing an autonomous measurement of the serving cell based on the measurement information.

Example 12 includes the method of example 11 or some other example herein, further comprising: performing a serving cell evaluation based on the autonomous measurement of the serving cell.

Example 13 includes the method of example 12 or some other example herein, further comprising: determining whether to drop the serving cell based on the serving cell evaluation.

Example 14 includes the method of example 12 or some other example herein, further comprising: performing the serving cell evaluation by comparing the autonomous measurement to a predetermined threshold.

Example 15 includes the method of example 11 or some other example herein, wherein receiving the MSI comprises: receiving a master information block transmission in a physical broadcast channel (PBCH); and receiving a system information block 1 (SIB1) transmission in a physical downlink shared channel (PDSCH).

Example 16 includes the method of example 15 or some other example herein, wherein performing the autonomous measurement comprises: measuring a synchronization signal and physical broadcast channel block (SSB).

Example 17 includes the method of example 16 or some other example herein, further comprising: determining, as part of the measurement information, that one or more SSBs are transmitted within an SSB burst based on an SSB bitmap within an SSB-positions-in-burst field of the SIB1 transmission.

Example 18 includes the method of example 16 or some other example herein, wherein: determining, as part of the measurement information, an SSB periodicity based on an indication within an SSB-periodicity field of the SIB1 transmission.

Example 19 includes the method of example 16 or some other example herein, further comprising: performing an initial attach with the serving cell based on the PBCH.

Example 20 includes the method of example 19 or some other example herein, further comprising: determining, as part of the measurement information, synchronization signal and physical broadcast channel block (SSB) frequency and subcarrier spacing based on the PBCH.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, TE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

receive, while in a radio resource control (RRC) idle or inactive state, a system information block 1 (SIB1) transmission from a serving cell, the SIB1 transmission having a synchronization signal and physical broadcast channel block (SSB) bitmap to indicate SSB symbols;

perform a serving cell measurement on the SSB symbols;

compare the serving cell measurement to a threshold, wherein the threshold is: a user equipment (UE)-configured threshold; obtained from a preconfigured database; or obtained from a system information block (SIB2) transmission received before receipt of the SIB1 transmission; and evaluate the serving cell based on comparison of the serving cell measurement to the threshold.

2. The one or more non-transitory, computer-readable media of claim 1, wherein the threshold is a UE-configured threshold.

3. The one or more non-transitory, computer-readable media of claim 1, wherein the SSB bitmap is within an SSB-positions-in-burst field of the SIB1 transmission.

4. The one or more non-transitory, computer-readable media of claim 1, wherein the instructions, when executed, further cause the device-processing circuitry to:

determine an SSB periodicity based on an indication within an SSB-periodicity field of the SIB1 transmission.

5. The one or more non-transitory, computer-readable media of claim 1, wherein the threshold is obtained from a preconfigured database.

6. The one or more non-transitory, computer-readable media of claim 1, wherein the instructions, when executed, further cause the processing circuitry to:

receive a physical broadcast channel (PBCH); and determine SSB frequency and subcarrier spacing based on the PBCH.

7. The one or more non-transitory, computer-readable media of claim 1, wherein the serving cell measurement is restricted to the SSB symbols.

8. The one or more non-transitory, computer-readable media of claim 1, wherein the instructions, when executed, further cause the processing circuitry to:

release the serving cell based on comparison of the serving cell measurement to the threshold; and initiate a cell-selection procedure based on release of the serving cell.

9. The one or more non-transitory, computer-readable media of claim 8, wherein the instructions, when executed, further cause the processing circuitry to:

release the serving cell based further on a determination that the serving cell measurement is less than the threshold for a predetermined period of time.

10. The one or more non-transitory, computer-readable media of claim 1, wherein the threshold is obtained from a SIB2 transmission received before receipt of the SIB1 transmission.

11. A method comprising:

receiving a system information block 1 (SIB1) transmission from a serving cell, the SIB1 transmission having a synchronization signal and physical broadcast channel block (SSB) bitmap to indicate SSB symbols;

performing a serving cell measurement on the SSB symbols;

comparing the serving cell measurement to a threshold, wherein the threshold is: a user equipment (UE)-configured threshold; obtained from a preconfigured database; or obtained from a system information block (SIB2) transmission received before receipt of the SIB1 transmission; and evaluating the serving cell based on the comparing of the serving cell measurement to the threshold.

12. The method of claim 11, wherein the threshold is a UE-configured threshold.

13. The method of claim 11, wherein the threshold is obtained from a preconfigured database.

14. The method of claim 12, wherein the threshold is obtained from a system information block 2 (SIB2) transmission received before receipt of the SIB1 transmission.

15. An apparatus comprising:

memory to store minimum system information (MSI) received from a serving cell in a system information block 1 (SIB1) transmission in a physical downlink shared channel (PDSCH), the SIB1 transmission having a synchronization signal and physical broadcast channel block (SSB) bitmap to indicate SSB symbols; and processing circuitry coupled with the memory, the processing circuitry to:

perform a serving cell measurement on the SSB symbols;

compare the serving cell measurement to a threshold, wherein the threshold is: a user equipment (UE)-configured threshold; obtained from a preconfigured database; or obtained from a system information block (SIB2) transmission received before receipt of the SIB1 transmission; and evaluate the serving cell based on comparison of the serving cell measurement to the threshold.

16. The apparatus of claim 15, wherein the threshold is a UE-configured threshold.

17. The apparatus of claim 15, wherein the SSB bitmap is within an SSB-positions-in-burst field of the SIB1 transmission.

18. The apparatus of claim 15, wherein the processing circuitry is further to:

determine an SSB periodicity based on an indication within an SSB-periodicity field of the SIB1 transmission.

19. The apparatus of claim 15, wherein the threshold is obtained from a preconfigured database.

20. The apparatus of claim 19, wherein the threshold is obtained from a system information block (SIB2) transmission received before receipt of the SIB1 transmission.

\* \* \* \* \*